Oct. 27, 1931.  E. R. VINSON  1,829,121

SOUND RECORDING APPARATUS

Filed June 15, 1929  2 Sheets-Sheet 1

Inventor;
ELLIOTT R. VINSON.
By Horace Barnes
Attorney.

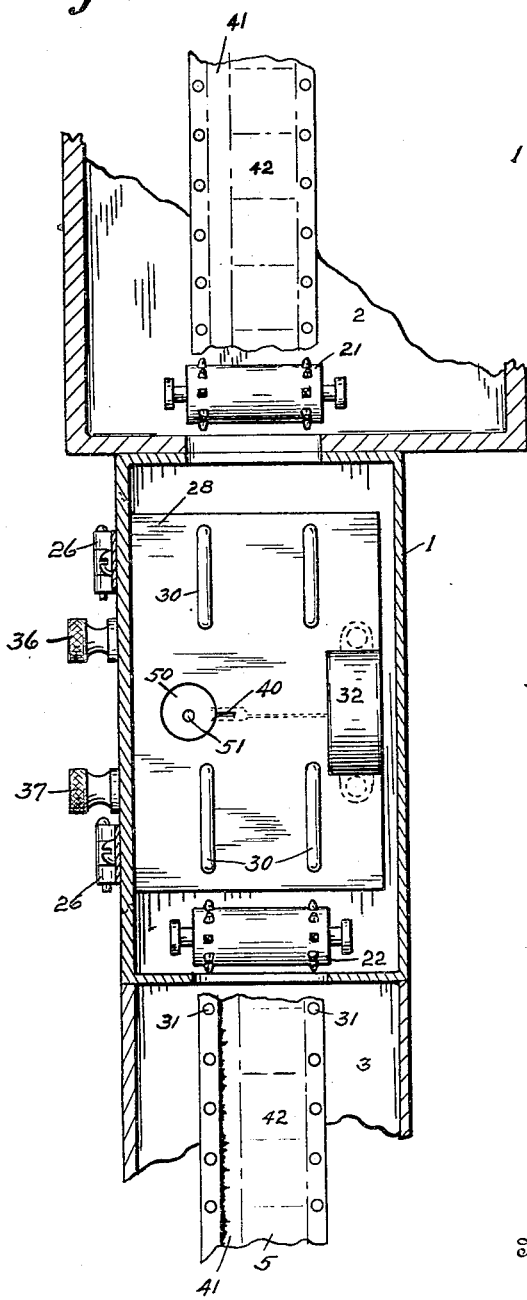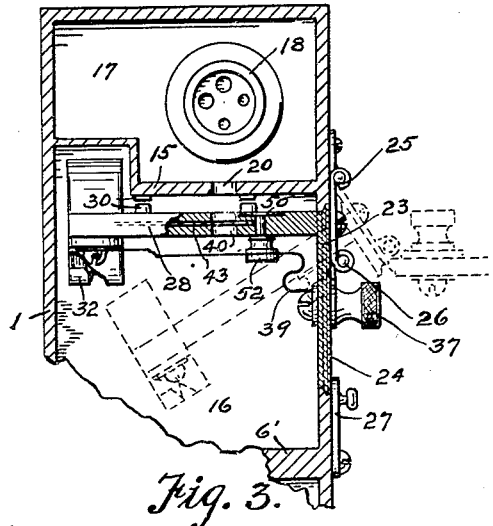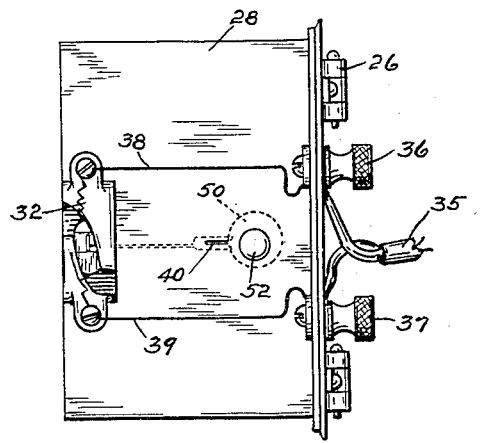

Patented Oct. 27, 1931

1,829,121

UNITED STATES PATENT OFFICE

ELLIOTT R. VINSON, OF COTTAGE GROVE, OREGON

SOUND RECORDING APPARATUS

Application filed June 15, 1929. Serial No. 371,289.

This invention relates to electro-magnetic apparatus for the recording of sound upon moving-picture film, and particularly to improvements in the light-valve apparatus for electrically recording sound variations upon a film negative by the variable area method in which variations in sound are recorded by variations in the area of a uniformly dark line exposed upon the film.

The object of the invention is the provision of a light-valve of simple construction wherein a shutter is operatively connected with an electro-magnet to vibrate in the major-axis of a light-slit through which the exposure of the film is made in response to current alternations amplified from the microphone and superimposed upon the magnetizing current. Thus sound is recorded upon the film by the oscillations of the shutter or light-valve exposing an area or light-track of more or less width but of uniform density as to light, appearing as a heavy line having one jagged edge denoting the sound variations.

The invention consists in the novel construction, adaptation and arrangement of a light-valve as applied to the electrical recording of sound as will be hereinafter described and claimed.

The accompanying drawings illustrate by way of example an embodiment of my invention in simplified but operative form, in which:

Fig. 2 is a view in vertical section taken on line 2—2 of Fig. 1.

Fig. 3 is a partial cross-sectional view on line 3—3 of Fig. 1.

Fig. 4 is a detached view in front elevation of the hinged panel in which the light exposure slit is formed and upon which the shutter mechanism therefor is mounted.

Figure 1:
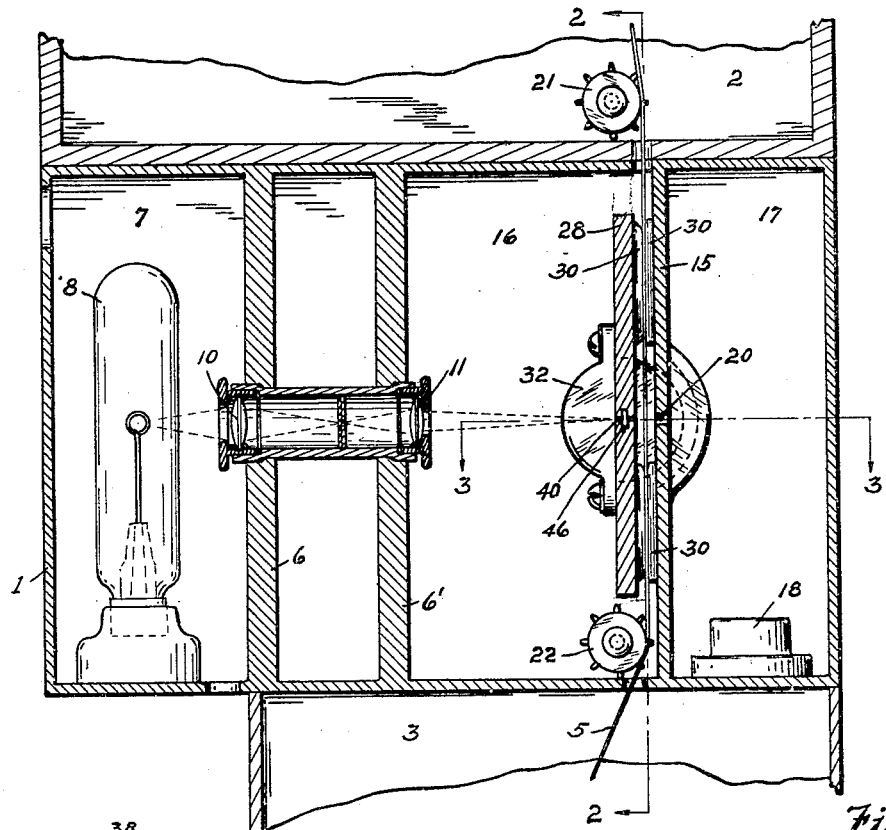
Figure 1 is a view in vertical section of sound recording apparatus constructed in accordance with my invention.
Figures 5, 6:
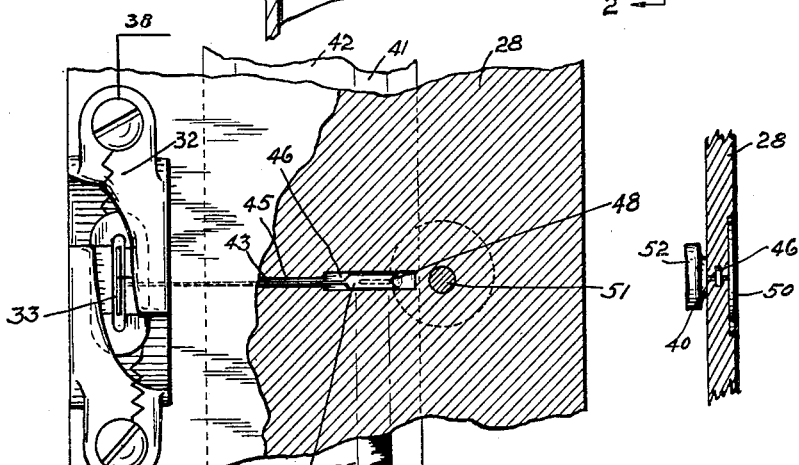
Fig. 5 is a detached view in side elevation, partly broken away, and upon an enlarged scale, of a portion of the hinged panel showing in detail the electro-magnetic vibrating and shutter devices.
Fig. 6 is a fragmentary view in vertical section of the panel taken through the exposure slit.

Referring to said views, the reference numeral 1 indicates a casing of rectangular form secured to and dependent from a moving-picture camera, indicated at 2. Similarly, the take-up magazine 3 in which the exposed film 5 is received is disposed below said casing. The casing is provided with a double partition 6, 6' to form a compartment 7 in which a ribbon-filament electric-lamp 8 is installed. In the spaced partitions 6, 6' the lenses 10 and 11 are mounted to focus the light from said lamp upon the light-slit, as will be hereinafter described.

A partition 15 further divides the interior of the casing into compartments 16 and 17, in the latter of which a photo-electric cell, not shown, may be mounted in the socket 18 to receive light rays through the aperture 20 in the wall 15 after they have passed through the film whereby the recording of sound upon the film may be audibly monitored in a well known manner.

Sprocket-roller 21 is mounted in the lower portion of the camera 2 and a similar roller 22 in the compartment 16 is positioned adjacent the bottom of the partition 15. Said rollers are driven in unison by suitable connective mechanism, not expressly shown, to actuate the film continuously and smoothly past the light aperture and in step with the intermittent feed apparatus of the camera.

An opening is made in the side of the casing closed by door-sections 23 and 24 hingedly connected to the casing at 25 and connected together by a hinge-point 26. 27 is a latch to secure the door-sections in closed condition. A panel 28 is rigidly mounted on the door-section 23 to extend in parallel spaced relation from the partition 15 when the door is closed and to swing away therefrom when the door is opened to admit of the film being readily threaded through the casing. Oppositely disposed pairs of resilient pads 30 are mounted upon the opposing faces of the panel and partition, respectively, between which the film is lightly engaged, said pads being disposed to contact with the film in line with the sprocket-holes 31 thereof.

Mounted upon the panel 28 is an electro-magnetic device 32 including a vibrator-plate 33 disposed in a plane at right angles to the magnetic field of the electro-magnet. The output terminal wires 35 of the audio amplifier, not shown, through which the variations in the electric current from the microphone, not shown, are strengthened are connected to the binding-posts 36 and 37 mounted upon the door-section 24 and thence the current is conveyed through wires 38 and 39 to the respective pole windings of the electro-magnet where the amplifier output is superimposed upon the magnetizing current to actuate the vibrator in accordance with the frequency of the current vibrations.

The panel 28 is formed with a light-slit 40 of approximately .0625 in. in length disposed transversely to the direction of travel of the film and approximately .0005 in. in width and which is in register with a photo-sensitized strip 41 of the film called the light-track adjacent and to one side of the picture-frames 42. A rod 43 is connected medially of the vibrator-plate 33 and extends in horizontal directions through a bore or groove 45 in the panel to an enlarged opening 46 serving as a shutter-guide where a shutter or light-valve 47 is positioned to be oscillated horizontally and disposed to mask the light-slit except at its outer end. Said shutter is operatively connected to said rod and to be vibrated thereby with slight resistance, the parts being of extremely light construction to avoid the retarding or lagging effects of undue inertia.

The outer extremity of the shutter may desirably be formed with a reentrant angular or V-shaped notch 48 whose inner apex may be spaced from the outer end of the light-slit by an extremely slight distance to admit of a narrow line of light through the slit when the shutter is inactive. To facilitate the adjustment of such outer edge of the light-slit relative to the shutter-notch or the effective end of the shutter a thin disk 50 is rotatably mounted upon the rear side of the panel in eccentric relation upon a spindle 51 and arranged to be manipulated by a spindle-head 52. It will be seen that by turning the disk in the desired direction the operator may cause its edge to overlie more or less of the outer end of the slit to provide the desired width of unbroken exposed light-sound record at the base of the broken variable recording.

It will be apparent that the shutter 47 is oscillated by direct connection with the vibrator element of the electro-magnet in response to variations in the electric current from the microphone and amplifier to expose to the light rays emitted from the lamp 8 a line of variable width upon the film. The undisturbed shutter-opening, with or without the employment of the adjustment-disk 50, appears on the film as a narrow line. The width of this line is caused to widen with a variation in area in accordance with the variations in the audio frequency current supplied to the vibrator-plate so that the width of such line indicates with reproductive fidelity the variations in sound pitch as controlled by the microphone. The exposed sound record 53 will appear upon the positive film as a solid dark band having a jagged or hill-and-dale edge 55 whose height from the base edge 56 determines the pitch while the extremely fine serrations or indentations along the edge 55 records the modulations giving the more delicate characterization of the voice or music.

The apparatus is simple in construction and in operation and through such simplicity of structure and manipulation is particularly well adapted as an attachment for portable moving picture cameras and for amateur work.

Having described my invention, what I claim, is:—

1. In photo-recording apparatus, in combination with a film-strip having a photo-sensitized light-track thereon, and means for actuating the film in continuous movement, of a panel against which said film moves having an exposure-slit extending transversely of and in register with said light-track, a shutter formed with a V-shaped notch at its outer end, said shutter masking said slit and mounted for vibratile movements longitudinally of the slit to expose portions of said light-track, and electro-magnetic means for effecting the vibration of said shutter.

2. In photo-recording apparatus, in combination with a film-strip having a photo-sensitized light-track thereon, and means for actuating the film in continuous movement, of a panel against which said film moves having an exposure-slit extending transversely of and in register with said light-track, an eccentrically mounted disc on said panel arranged to adjustably limit the opening of said slit, a shutter formed with a V-shaped notch at its outer end, said shutter masking said slit and mounted for vibration longitudinally of the slit to expose portions of said light-track, and electro-magnetic means for effecting the vibration of said shutter.

3. In photo-recording apparatus, in combination with a film-strip having a photo-sensitized light-track thereon, and means for actuating the film in continuous movement, of a panel against which said film moves having an exposure-slit extending transversely of and in register with said light-track, means to adjust the length of said exposure-slit, a shutter formed with a V-shaped notch at its outer end, said shutter masking said slit and mounted for vibratile movements longitudinally of the slit to expose portions of said light-track, and electro-magnetic means for effecting the vibration of said shutter.

ELLIOTT R. VINSON.